United States Patent
Koh et al.

(10) Patent No.: US 8,007,679 B2
(45) Date of Patent: Aug. 30, 2011

(54) ELECTROLYTIC SOLUTION

(75) Inventors: Meiten Koh, Settsu (JP); Akiyoshi Yamauchi, Settsu (JP); Yasuko Takagahara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 628 days.

(21) Appl. No.: 11/887,540

(22) PCT Filed: Mar. 28, 2006

(86) PCT No.: PCT/JP2006/306249
§ 371 (c)(1),
(2), (4) Date: Oct. 1, 2007

(87) PCT Pub. No.: WO2006/106657
PCT Pub. Date: Oct. 12, 2006

(65) Prior Publication Data
US 2009/0134353 A1    May 28, 2009

(30) Foreign Application Priority Data
Mar. 30, 2005 (JP) .................. 2005-099371

(51) Int. Cl.
*H01G 9/02* (2006.01)
(52) U.S. Cl. .................. 252/62.2; 252/500; 429/342
(58) Field of Classification Search .................. 252/62.2, 252/500; 429/342
See application file for complete search history.

(56) References Cited

U.S. PATENT DOCUMENTS

| | | |
|---|---|---|
| 5,830,600 A | 11/1998 | Narang et al. |
| 5,891,588 A | 4/1999 | Sakai et al. |
| 2009/0291364 A1 | 11/2009 | Koh et al. |

FOREIGN PATENT DOCUMENTS

| | | |
|---|---|---|
| CN | 1220029 A | 6/1999 |
| EP | 1 213 778 A2 | 6/2002 |
| JP | 6-176768 A | 6/1994 |
| JP | 6-219992 A | 8/1994 |
| JP | 8-37024 A | 2/1996 |
| JP | 10-149840 A | 6/1998 |
| JP | 11-307123 A | 11/1999 |
| JP | 2000-090968 * | 3/2000 |
| JP | 2000-164247 A | 6/2000 |
| JP | 2000-228216 A | 8/2000 |
| JP | 2000-294281 A | 10/2000 |
| JP | 2000-327634 * | 11/2000 |
| JP | 2000-327634 A | 11/2000 |
| JP | 2001-256983 A | 9/2001 |
| JP | 2001-516492 A | 9/2001 |
| JP | 2002-175837 A | 6/2002 |
| WO | 9744842 A1 | 11/1997 |

OTHER PUBLICATIONS

Machine Translation of JP 2000-090968.*
Non-Final Office Action dated Oct. 21, 2010 for copending U.S. Appl. No. 11/887,548.

* cited by examiner

*Primary Examiner* — Harold Pyon
*Assistant Examiner* — Haidung Nguyen
(74) *Attorney, Agent, or Firm* — Sughrue Mion, PLLC

(57) ABSTRACT

There is provided an electrolytic solution comprising a chain carbonate (I) represented by the formula (I):

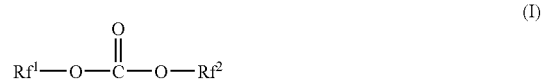

wherein $Rf^1$ is a fluorine-containing ether group (Ia) having $CF_3$ at its end; $Rf^2$ is a fluorine-containing ether group or a fluorine-containing alkyl group, and an electrolyte salt (II), and the electrolytic solution is excellent in flame retardance, low temperature characteristics, withstand voltage and compatibility with a hydrocarbon solvent and high in solubility of an electrolyte salt.

8 Claims, No Drawings

ELECTROLYTIC SOLUTION

TECHNICAL FIELD

The present invention relates to an electrolytic solution comprising a chain carbonate having, at least at one end thereof, a fluorine-containing ether group having $CF_3$ at its end and an electrolyte salt.

BACKGROUND ART

Carbonates such as ethylene carbonate, propylene carbonate and dimethyl carbonate are used as a solvent for an electrolyte salt of lithium secondary battery, solar cell, radical battery and capacitor. However since a flash point is low and combustibility is high, there is a danger of firing and explosion attributable to over-charging and over-heating, and in addition, since viscosity is high and conductivity at low temperatures is low, there is a problem that an output is decreased.

In order to solve those problems, it is proposed to use a fluorine-containing chain carbonate obtained by fluorinating a chain carbonate. For example, there are proposed carbonates in which an end of a fluorine-containing alkyl group is perfluoro, such as a carbonate having a fluorine-containing alkyl group at one end thereof and a hydrocarbon alkyl group at another end (JP6-219992A), a dicarbonate having an ethylene in its center and $CF_3(CF_2)(CH_2)$— at both ends thereof (JP10-149840A) and a carbonate having hexafluoroisopropyl groups at both ends thereof (JP2001-256983A), and in addition, a carbonate having a fluorine-containing ether group at one end thereof and a hydrocarbon alkyl group at another end thereof (JP2000-327634A).

However, carbonates having a fluorine-containing alkyl group terminated with a perfluoro group (JP10-149840A and JP2001-256983A) have disadvantages that solubility of an electrolyte salt is low and compatibility with hydrocarbon solvents is inferior. With respect to carbonates having a hydrocarbon alkyl group at one end thereof (JP6-219992A and JP2000-327634A), solubility of an electrolyte salt and compatibility with hydrocarbon solvents are improved, but there are lowering of flame retardance and decrease in a withstand voltage due to a decreased fluorine content.

On the other hand, there is proposed a method of adding a fluorine-containing ether compound (JP6-176768A, JP8-37024A, JP11-307123A and JP2000-294281A).

However, fluorine-containing ether compounds have lower viscosity at low temperatures as compared with carbonates having a fluorine-containing alkyl group at an end thereof, but there are disadvantages that solubility of a lithium salt as an electrolyte salt is low and compatibility with hydrocarbon carbonates used as a solvent for dissolving an electrolyte salt is low, thereby causing separation into two phases. In addition, since a flash point is relatively low, an improvement in flame retardance is necessary. Those are important problems to be solved.

Also in the case of electrolytic solutions for capacitors and radical batteries which repeat charging and discharging like lithium secondary batteries, improvement in flame retardance and a withstand voltage and enhancement of low temperature characteristics where viscosity is not high even at low temperatures and yet decrease in conductivity is small are desired.

DISCLOSURE OF INVENTION

The present invention aims at solving the above-mentioned problems involved in conventional technologies and an object of the present invention is to provide an electrolytic solution having excellent low temperature characteristics, an adequate withstand voltage, enhanced flame retardance, high solubility of an electrolyte salt and excellent compatibility with a hydrocarbon solvent.

The present inventors have found that disadvantages of a chain carbonate having fluorine-containing ether groups such as lowering of solubility of an electrolyte salt and compatibility with hydrocarbon solvents and insufficient flame retardance can be solved by introducing $CF_3$ to an end of at least one fluorine-containing ether group while maintaining effects of the fluorine-containing ether group such as excellent low temperature characteristics and adequate withstand voltage which the chain carbonate having a fluorine-containing ether group has, and have completed the present invention.

Namely, the present invention relates to an electrolytic solution comprising a chain carbonate (I) represented by the formula (I):

(I)

wherein $Rf^1$ is a fluorine-containing ether group (Ia) having $CF_3$ at its end (hereinafter in some cases this group is simply referred to as "$CF_3$-terminated fluorine-containing ether group"); $Rf^2$ is a fluorine-containing ether group or a fluorine-containing alkyl group, and an electrolyte salt (II).

BEST MODE FOR CARRYING OUT THE INVENTION

The electrolytic solution of the present invention comprises the specific chain carbonate (I) which is a solvent for dissolving an electrolyte salt and has a $CF_3$-terminated fluorine-containing ether group and the electrolyte salt (II).

The chain carbonate (I) having a $CF_3$-terminated fluorine-containing ether group which is used in the present invention is represented by the formula (I):

(I)

wherein $Rf^1$ is a fluorine-containing ether group (Ia) having $CF_3$ at its end, preferably a fluorine-containing ether group having 2 to 16 carbon atoms; $Rf^2$ is a fluorine-containing ether group, preferably a fluorine-containing ether group having 2 to 16 carbon atoms and containing $CF_3$ or $CH_3$ at its end or a fluorine-containing alkyl group, preferably a fluorine-containing alkyl group having 2 to 16 carbon atoms and containing $CF_3$ or $CH_3$ at its end.

Since the chain carbonate of the present invention has $CF_3$ at least at one end thereof, further decrease in viscosity at low temperatures, and increase in a flash point can be expected.

The number of carbon atoms of the fluorine-containing ether groups $Rf^1$ and $Rf^2$ is preferably 2 to 16, and the number of carbon atoms of the fluorine-containing alkyl group of $Rf^2$ is preferably 1 to 16, and in either of $Rf^1$ and $Rf^2$, when the number of carbon atoms exceeds 16, viscosity of the chain carbonate (I) becomes high and the number of fluorine-containing groups increases, thereby causing, in some cases, lowering of solubility of an electrolyte salt and compatibility with other solvents due to decrease in a dielectric constant.

From this point of view, with respect to $Rf^1$ and $Rf^2$, the number of carbon atoms in the case of fluorine-containing ether group is preferably 2 to 10, particularly preferably 2 to 7, and the number of carbon atoms in the case of fluorine-containing alkyl group is preferably 1 to 10, particularly preferably 1 to 7.

The fluorine content of $Rf^1$ and $Rf^2$ is preferably not less than 10% by mass, and when the fluorine content is smaller, an effect of enhancing viscosity at low temperatures and an effect of increasing a flash point cannot be obtained sufficiently. From this point of view, the fluorine content of $Rf^1$ and $Rf^2$ is preferably not less than 20% by mass, more preferably not less than 30% by mass. An upper limit thereof is usually 76% by mass. The fluorine content of $Rf^1$ and $Rf^2$ is calculated from the composition of the component atoms.

The fluorine content of the whole fluorine-containing chain carbonate (I) is not less than 10% by mass, preferably not less than 20% by mass, and an upper limit thereof is usually 76% by mass. The fluorine content of the whole fluorine-containing chain carbonate is measured by a combustion method explained infra.

$Rf^1$ is a fluorine-containing ether group, and an alkylene group constituting the ether portion may be a linear or branched alkylene group. Examples of a minimum structural unit constituting such a linear or branched alkylene group are raised below.

(i) Minimum Structural Unit of Linear Type
—$CH_2$—, —CHF—, —$CF_2$—, —CHCl—, —CFCl—, —$CCl_2$—

(ii) Minimum Structural Unit of Branched Type

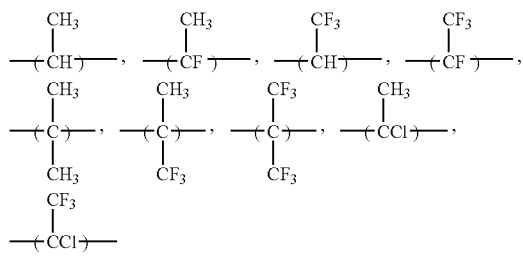

The alkylene group has any one of these minimum structural units alone or a combination of linear types (i) or branch types (ii) or an optional combination thereof. Preferable examples are explained infra.

It is preferable that the alkylene group has a minimum structural unit having no Cl among the above-mentioned examples, because a de-HCl reaction by a base does not occur and the structural unit is stable.

Further preferable $Rf^1$ is a $CF_3$-terminated fluorine-containing ether group represented by the formula (Ia-1):

$$CF_3(R^1)_{n1}\text{—}(OR^2)_{n2} \quad (Ia\text{-}1)$$

wherein $R^1$ and $R^2$ are the same or different and each is an alkylene group which may have fluorine atom, preferably an alkylene group having 1 to 4 carbon atoms which may have fluorine atom; n1 is 0 or 1; n2 is an integer of 1 to 3. Examples of $R^1$ and $R^2$ are the above-mentioned alkylene groups, and these may be used in optional combination.

More specifically there are exemplified the following combinations, but the ether group is not limited to them.

When n1 is 0, there is $CF_3$—, and when n1 is 1, there are exemplified those having a linear $R^1$ such as $CF_3CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CF_2CF_2CH_2$—, $CF_3CF_2CF_2CF_2$— and $CF_3CH_2CF_2CH_2$—, and those having a branched $R^1$ such as:

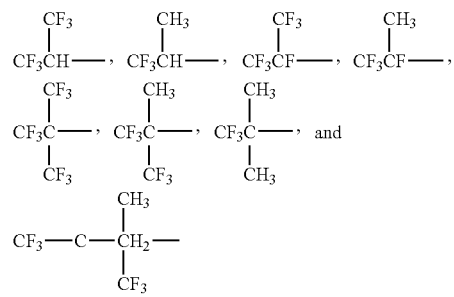

However when having a branch such as —$CH_3$ or —$CF_3$, since viscosity is easily increased, a linear type is more preferred.

n2 is an integer of 1 to 3, preferably 1 or 2. When n2 is 2 or 3, $R^2$ may be the same or different.

Preferable examples of $R^2$ are the following linear types or branched types.

Examples of linear type are —$CH_2$—, —CHF—, —$CF_2$—, —$CH_2CH_2$—, —$CF_2CH_2$—, —$CF_2CF_2$—, —$CH_2CF_2$—, —$CH_2CH_2CH_2$—, —$CH_2CH_2CF_2$—, —$CH_2CF_2CH_2$—, —$CH_2CF_2CF_2$—, —$CF_2CH_2CH_2$—, —$CF_2CF_2CH_2$—, —$CF_2CF_2CF_2$— and the like, and examples of branched type are:

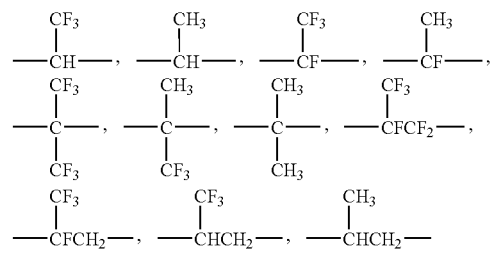

and the like.

Another fluorine-containing organic group $Rf^2$ of the chain carbonate (I) is (1) a fluorine-containing ether group having $CF_3$ at its end, (2) a fluorine-containing ether group having $CH_3$ at its end, or (3) a fluorine-containing alkyl group.

Examples of the fluorine-containing ether group (1) having $CF_3$ at its end are the same as the $CF_3$-terminated fluorine-containing ether group explained in the above-mentioned $Rf^1$ and the examples thereof.

Examples of the fluorine-containing ether group (2) having $CH_3$ at its end are those obtained by substituting the end $CF_3$ of the $CF_3$-terminated fluorine-containing ether groups explained supra in the $Rf^1$, with $CH_3$. Among them, preferable are fluorine-containing ether groups (2) having, at an end thereof, $CH_3$—, $CH_3H_2$—, $CH_3CH_2CH_2$—, $CH_3CH(CH_3)$—, $(CH_3)_3C$—, $CH_3CF_2CF_2$—, or $CH_3CF_2CH_2$—, from the viewpoint of excellent solubility of an electrolyte salt and compatibility with hydrocarbon solvents.

Examples of the fluorine-containing alkyl group (3) are fluorine-containing alkyl groups having the number of carbon atoms of preferably 1 to 16, more preferably 1 to 10, further preferably 1 to 7, especially 1 to 4.

Specifically there are exemplified fluorine-containing alkyl groups represented by the formula (IIa):

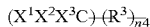

wherein $X^1$, $X^2$ and $X^3$ are the same or different and each is H or F; $R^3$ is an alkylene group which may have fluorine atom, preferably an alkylene group having 1 to 9 carbon atoms which may have fluorine atom; n4 is 0 or 1; when all of $X^1$, $X^2$ and $X^3$ are H, $R^3$ has fluorine atom.

Examples of $R^3$ are single use or combination use of the minimum linear structural units (i) and the minimum branched structural units (ii) explained in the above-mentioned $Rf^1$ and the examples thereof. However among these examples, preferable are the alkylene groups containing a structural unit having no Cl, because a de-HCl reaction by a base does not occur and the structural unit is stable.

Preferable examples of $Rf^2$ are $HCF_2$—, $H_2CF$—, $CH_3CF_2CH_2$—, $HCF_2CH_2CH_2$—, $CH_3CHFCH_2$—, $H_2CFCH_2CH_2$—, $HCF_2CHFCH_2$—, $H_2CFCF_2CH_2$—, $HCFClCF_2CH_2$—, $HCF_2CFClCH_2$—, $CH_3CHFCH_2CHFCH_2$—, $CH_3CF_2CH_2CF_2CH_2$—, $HCF_2CH_2CF_2CH_2CH_2$—, $HCF_2CHFCF_2CHFCH_2$—, $H_2CFCF_2CFHCF_2CH_2$—, $H_2CFCF_2CHFCF_2CH_2$—, $H_2CFCH_2CHFCH_2CH_2$—, $HCF_2CFClCF_2CFClCH_2$—, $HCFClCF_2CFClCF_2CH_2$—,

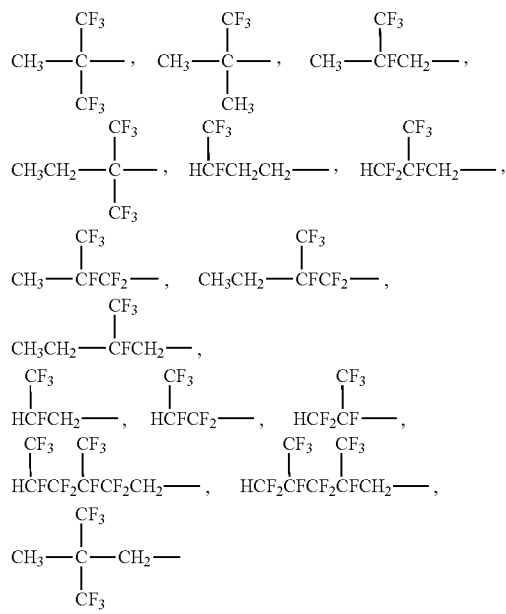

and the like. However when having a branch such as —$CH_3$ or —$CF_3$, since viscosity is easily increased, it is more preferable that the number of such branches is smaller (one) or zero.

Further preferable —$Rf^2$ is a fluorine-containing alkyl group having hydrogen atom at its end and represented by:

$(HCX^1X^2)\text{—}(CF_2)_n\text{—}(CH_2)_m\text{—}$ (IIa-1)

wherein $X^1$ and $X^2$ are the same or different and each is H or F; n is 0 or an integer of 1 to 10; m is 0 or an integer of 1 to 5; when $X^1$ and $X^2$ are H, n is not 0.

Examples of the fluorine-containing alkyl group represented by the formula (IIa-1) are:

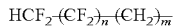

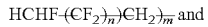 and

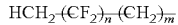

and particularly when n is 0 or an integer of 1 to 4, a dielectric constant is high, solubility of an electrolyte salt is enhanced and compatibility with other solvents is excellent. When m is 0 or an integer of 1 to 2, effects of improving flame retardance and increasing a withstand voltage are satisfactory and viscosity is low (excellent low temperature characteristics).

The sum of n and m is not less than 0 and not more than 15, preferably not more than 6. When it exceeds 15, an effect of enhancing solubility of an electrolyte salt and compatibility with other solvents are lowered.

Specific examples thereof are:

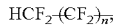

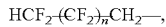

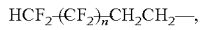

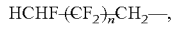

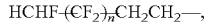

where n is 0 or an integer of 1 to 10, preferably 0 or an integer of 1 to 4, particularly preferably 0 or an integer of 1 to 2,

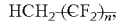

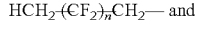 and

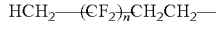

where n is an integer of 1 to 10, preferably an integer of 1 to 4, particularly preferably 1 or 2.

Examples of $Rf^2$ are these fluorine-containing alkyl groups having hydrogen atom at an end thereof and in addition, those obtained by changing $CH_3$—, $HCF_2$— and $H_2CF$— of the above examples of $Rf^2$ to $CF_3$—, for example, $CF_3$—, $CF_3CH_2$—, $CF_3CF_2$—, $CF_3CH_2CH_2$—, $CF_3CF_2CH_2$—, $CF_3CF_2CF_2$—, $CF_3CH(CF_3)$—, $CF_3CF_2CH_2CH_2$—, $CF_3CF_2CF_2CH_2$—, $(CF_3)_3C$—, $CF_3CH(CF_3)CH_2$—, $CF_3CF_2CF_2CH_2CH_2$— and the like.

$Rf^2$ may be a group having $CF_3$ or hydrogen atom at its end, and from the viewpoint of enhancement of a withstand voltage and solubility in a solvent, a fluorine-containing alkyl group having hydrogen atom at its end is desirable.

The chain carbonate (I) is made up by combination of these $Rf^1$ and $Rf^2$. The combination of these $Rf^1$ and $Rf^2$ may be optionally selected.

Then examples of the chain carbonate (1) having a $CF_3$-terminated fluorine-containing ether group which are especially preferable in the present invention are raised below but the present invention is not limited to them.

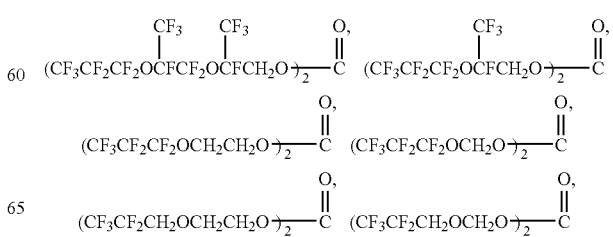

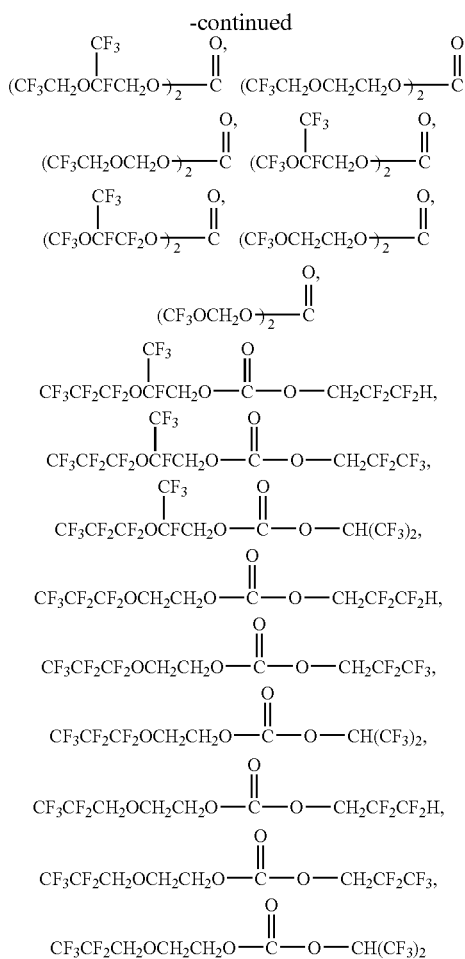

The chain carbonate (I) having a CF$_3$-terminated fluorine-containing ether group and represented by the formula (I) is a novel compound which has not been disclosed in any prior publications.

Example of a synthesis method is a method of subjecting one or two kinds of fluorine-containing alcohols represented by the formula (Ib):

Rf$^1$—OH or

Rf$^2$—OH wherein Rf$^1$ and Rf$^2$ are as defined above, to the following reactions.

(1) Reacting with phosgene such as COCl$_2$, COF$_2$ or triphosgene under basic condition.
(2) Reacting with a compound represented by the formula (Ic):

 (Ic)

wherein R$^4$ and R$^5$ are the same or different and each is an alkyl group, preferably methyl or ethyl, in the presence of a basic catalyst or an acid catalyst, and the reaction is progressed while distilling off an alcohol (methanol and ethanol) formed as a byproduct.

(3) Reacting with a compound represented by the formula (Id):

 (Id)

wherein R$^6$ and R$^7$ are the same or different and each is an aryl group, preferably phenyl, in the presence of a basic catalyst or an acid catalyst.

(4) Reacting with a compound represented by the formula (Ie):

 (Ie)

wherein R$^8$ is an alkyl group, preferably methyl or ethyl, under basic condition, and the reaction is progressed while distilling off an alcohol (methanol and ethanol) formed as a byproduct (5) Synthesis is carried out by two steps in such a manner that Rf$^1$—OH or Rf$^2$—OH is reacted in the presence of an equivalent amount of or an excessive amount of phosgene or trichlorophosgene to obtain

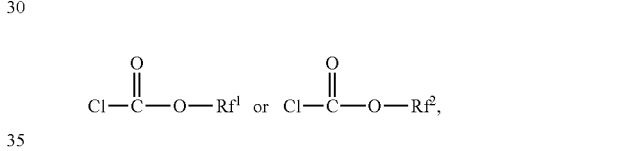

and then the obtained product is reacted with different kinds of fluorine-containing alcohols, respectively.

When Rf$^1$ and Rf$^2$ are different kinds of groups, the chain carbonate may be synthesized by two steps using the above-mentioned methods (4) and (5).

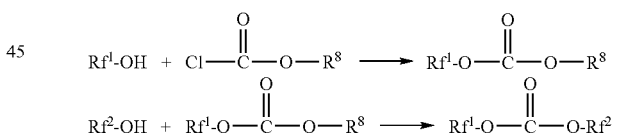

Examples of a method of synthesizing the fluorine-containing alcohol represented by the formula (Ib): Rf$^1$—OH or Rf$^2$—OH are, for instance, the following methods.

(1a) Addition Reaction Method

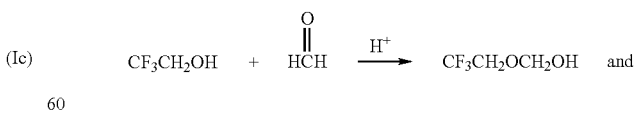 and

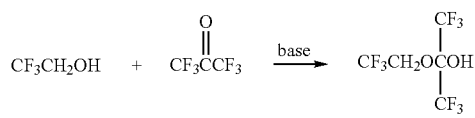

(2a) Substitution Reaction Method

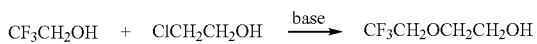

(3a) Condensation Reaction Method

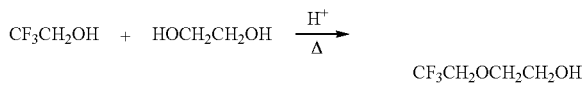

(4a) Ring-Opening Reaction Method

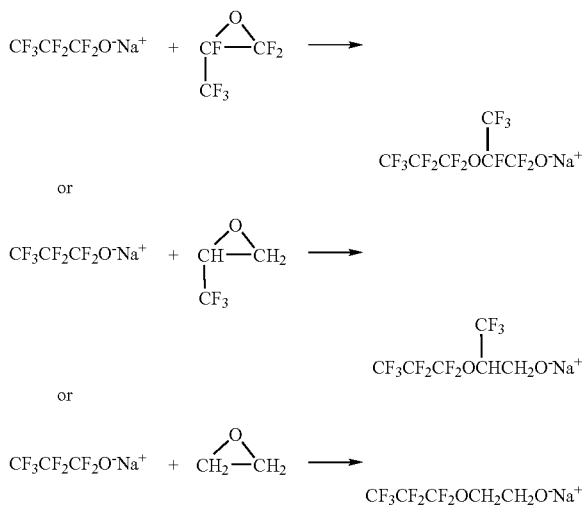

In the present invention, one or more kinds of other solvents (III) for dissolving an electrolyte salt may be mixed as a solvent for dissolving an electrolyte salt in addition to the chain carbonate (I) having a $CF_3$-terminated fluorine-containing ether group.

The other solvents (III) for dissolving an electrolyte salt may be non-fluorine-containing solvents such as hydrocarbon carbonate solvents, nitrile solvents, lactone solvents and ester solvents, and fluorine-containing solvents other than the fluorine-containing chain carbonate (I).

Examples of non-fluorine-containing solvents are, for instance, ethylene carbonate, propylene carbonate, butylene carbonate, γ-butyrolactone, 1,2-dimethoxyethane, tetrahydrofuran, 2-methyltetrahydrofuran, 1,3-dioxolan, 4-methyl-1,3-dioxolan, methyl formate, methyl acetate, methyl propionate, dimethyl carbonate, ethyl methyl carbonate, diethyl carbonate, acetonitrile, propionitrile, succinonitrile, butyronitrile, isobutyronitrile, benzonitrile, glutaronitrile, dimethyl sulfoxide, methylpyrrolidone and the like. Especially from the viewpoint of improvement in a dielectric constant, oxidation resistance and electrochemical stability, preferable are ethylene carbonate, propylene carbonate, diethyl carbonate, γ-butyrolactone, 1,2-dimethoxyethane, 1,3-dioxolan, acetonitrile, propionitrile, succinonitrile, butyronitrile, isobutyronitrile, benzonitrile and glutaronitrile.

Preferable examples of fluorine-containing solvents other than the fluorine-containing chain carbonate (I) are, for instance, fluorine-containing carbonates disclosed in JP6-219992A, JP10-149840A, JP2001-256983A and JP2000-327634A, especially fluorine-containing carbonates disclosed in JP6-219992A and JP2001-256983A, and fluorine-containing ethers disclosed in JP6-176768A, JP8-37024A, JP11-307123A and JP2000-294281A.

On the other hand, fluorine-containing ethers are excellent in an effect of enhancing non-flammability and are useful, but are low in compatibility with non-fluorine-containing solvents for dissolving an electrolyte salt, particularly hydrocarbon carbonates such as ethylene carbonate and diethylene carbonate. When a fluorine-containing ether is mixed in a given amount or more to a non-fluorine-containing solvent for dissolving an electrolyte salt, in some cases, separation into two layers occurs. However, in the presence of the fluorine-containing chain carbonate (I), a homogeneous solution of these three components can be easily formed. It is conjectured that the fluorine-containing chain carbonate (I) functions as a compatibilizer for making the fluorine-containing ether compatible with the non-fluorine-containing solvent for dissolving an electrolyte salt. Therefore, further enhancement of non-flammability can be expected in the case of a homogeneous electrolytic solution comprising the fluorine-containing chain carbonate (I), the electrolyte salt (II), the non-fluorine-containing solvent for dissolving the electrolyte salt and the fluorine-containing ether.

The amount of the other solvent (III) for dissolving the electrolyte salt is not less than 1% by mass, preferably not less than 10% by mass, particularly preferably not less than 20% by mass in the whole solvents for dissolving the electrolyte salt, from the viewpoint of satisfactory solubility of the electrolyte salt. An upper limit thereof is 98% by mass, preferably 90% by mass, especially 80% by mass from the viewpoint of flame retardance, low temperature characteristics and a withstand voltage.

Particularly in capacitors, a higher concentration of the electrolyte salt in the electrolytic solution is desirable because of capability of coping with a large current density. From this point of view, it is preferable to jointly use hydrocarbon solvents being excellent in solubility of the electrolyte salt, particularly propylene carbonate, γ-butyrolactone, acetonitrile, 1,3-dioxolane and the like.

Next, the electrolyte salt (II) which is another component of the electrolytic solution of the present invention is explained.

Examples of the electrolyte salt (II) usable in the present invention are known metallic salts, liquid salts (ionic liquid), inorganic polymer salts, organic polymer salts and the like.

Of these electrolyte salts, there are particularly suitable compounds depending on purposes of the electrolytic solution. Then examples of suitable electrolyte salts classified by applications are raised below, but the electrolyte salt is not limited to them. The electrolyte salts raised below can be optionally used for other applications.

Firstly, various organic metallic salts of boron anion type, oxygen anion type, nitrogen anion type, carbon anion type and phosphorus anion type can be used as metallic salts for lithium secondary batteries, and it is preferable to use metallic salts of oxygen anion type and nitrogen anion type.

Specifically $CF_3SO_3Li$, $C_4F_9SO_3Li$, $C_8F_{17}SO_3Li$, $CH_3SO_3Li$, $C_6H_5SO_3Li$, $LiSO_3C_2F_4SO_3Li$, $CF_3CO_2Li$, $C_6H_5CO_2Li$, $Li_2C_4O_4$ and the like are used as the metallic salt of oxygen anion type, and it is particularly preferable to use $CF_3SO_3Li$, $C_4F_9SO_3Li$ and $C_8F_{17}SO_3Li$.

Examples of the metallic salt of nitrogen anion type are $(CF_3SO_2)_2NLi$ (TFSI), $(C_2F_5SO_2)_2NLi$ (BETI), $(CF_3SO_2)(C_4F_9SO_2)NLi$, $(CF_3SO_2)(C_8F_{17}SO_2)NLi$, $(CF_3CO)_2NLi$, $(CF_3CO)(CF_3CO_2)NLi$, $((CF_3)_2CHOSO_2)_2NLi$, ($C_2F_5CH_2OSO_2)_2NLi$ and the like, and it is particularly preferable to use $(CF_3SO_2)_2NLi$ (TFSI) and $(C_2F_5SO_2)_2NLi$ (BETI).

Examples of an inorganic metallic salt which can be used are $LiPF_6$, $LiBF_4$, $LiAsF_6$, $LiClO_4$ and the like, and it is particularly preferable to use $LiPF_6$ and $LiBF_4$.

Examples of an organic metallic salt for capacitors are tetraalkyl quaternary ammonium salts represented by $(Me)_x(Et)_yN$, where Me is methylene, Et is ethylene, x and y are the same or different, and each is 0 or an integer of 1 to 4 and x+y=4. Specifically there are $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeBF_4$, $Et_3MeClO_4$, $Et_3MePF_6$, $Et_3MeAsF_6$, $Et_3MeSbF_6$, $Et_3MeCF_3SO_3$, $Et_3Me(CF_3SO_2)_2N$ and $Et_3MeC_4F_9SO_3$, and it is particularly preferable to use $Et_4NBF_4$, $Et_4NPF6$, $Et_4NSbF_6$ and $Et_4NAsF6$. In addition, of these tetraalkyl quaternary ammonium salts, it is desirable to use quaternary ammonium salts in which one or two alkyls are ethers, from the viewpoint of lowering of viscosity. For example, N,N-diethyl-N-methyl-N-(2-methoxyethyl)ammonium salt and the like are preferable since viscosity is low. Also spirobipyrrolidinium or its salt obtained by substituting a part of hydrogen atoms of spirobipyridinium with fluorine atoms is preferable because viscosity is low and particularly low temperature characteristics are excellent. In addition, among tetraalkyl quaternary ammonium salts, those in which alkyl groups are one or more fluorine-containing alkyl groups or fluorine-containing ethers are preferable from the viewpoint of enhancing oxidation resistance and lowering viscosity. Further imidazolium salts having fluorine atoms, fluorine-containing alkyl groups or fluorine-containing ether groups are preferable from the viewpoint of enhancing oxidation resistance and lowering viscosity. Preferable examples as anion species of the salts are $BF_4^-$, $PF_6^-$, $AsF_6^-$ and $SbF_6^-$ which are excellent in oxidation resistance.

Examples of an inorganic metallic salt which can be used are $LiPF_6$, $LiBF_4$, $LiAsF_6$, $LiClO_4$, $NaPF_6$, $NaBF_4$, $NaAsF_6$, $NaClO_4$, $KPF_6$, $KBF_4$, $KAsF_6$, $KClO_4$ and the like, and it is particularly preferable to use $LiPF_6$, $LiBF_4$, $NaPF_6$ and $NaBF_4$.

Examples of electrolyte salts for dye-sensitized solar cell are $R^9R^{10}R^{11}R^{12}NI$, where $R^9$ to $R^{12}$ are the same or different and each is an alkyl group having 1 to 3 carbon atoms, LiI, NaI, KI,

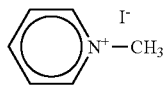

and the like.

When a liquid salt is used as the electrolyte salt (II), there are salts of organic or inorganic anion with polyalkylimidazolium cation, N-alkylpyridinium cation, tetraalkylammonium cation, tetraalkylammonium cation having ether chain, tetraalkylphosphonium cation or spirobipyrrolidinium cation for lithium secondary batteries, capacitors and dye-sensitized solar cells, and particularly 1,3-dialkylimidazolium salt, spirobipyrrolidinium salt and alkylammonium salt having ether chain are preferable. In addition, of the above-mentioned salts, those in which a part of cations are substituted with fluorine atoms are desirable from the viewpoint of lowering viscosity and enhancing oxidation resistance.

Examples of preferable polyalkylimidazolium cation are 1,3-dialkylimidazolium cations such as 1-ethyl-3-methylimidazolium cation ($EMI^+$) and 1-butyl-3-methylimidazolium cation ($BMI^+$); trialkylimidazolium cations such as 1,2-dimethyl-3-propylimidazolium cation ($DMPI^+$) and the like. In addition, cations obtained by substituting a part of hydrogen atoms of these cations with fluorine atoms are further preferable.

Examples of preferable inorganic anion are, for instance, $AlCl_4^-$, $BF_4^-$, $PF_6^-$, $AsF_6^-$, $I^-$ and the like, and examples of preferable organic anion are, for instance, $CH_3COO^-$, $CF_3COO^-$, $C_3F_7COO^-$, $CF_3SO_3^-$, $C_4F_9SO_3^-$, $(CF_3SO_2)_2N^-$, $(C_2F_5SO_2)_2N^-$ and the like.

Specifically there are $EMIAlCl_4$, $EMIBF_4$, $EMIPF_6$, $EMIAsF_6$, EMII, $EMICH_3COO$, $EMICF_3COO$, $EMIC_3F_7COO$, $EMICF_3SO_3$, $EMIC4F_9SO_3$, $EMI(CF_3SO_2)_2N$, $EMI(C_2F_5SO_2)_2N$, $BMIAlCl_4$, $BMIBF_4$, $BMIPF_6$, $BMIAsF_6$, BMII, $BMICH_3COO$, $BMICF_3COO$, $BMIC_3F_7COO$, $BMICF_3SO_3$, $BMIC_4F_9SO_3$, $BMI(CF_3SO_2)_2N$, $BMI(C_2F_5SO_2)_2N$, $DMPIAlCl_4$, $DMPIBF_4$, $DMPIPF_6$, $DMPIAsF_6$, DMPII, $DMPICH_3COO$, $DMPICF_3COO$, $DMPIC_3F_7COO$, $DMPICF_3SO_3$, $DMPIC_4F_9SO_3$, $DMPI(CF_3SO_2)_2N$, $DMPI(C_2F_5SO_2)_2N$ and the like.

Particularly for dye-sensitized solar cells, iodides such as EMII, BMII and DMPII are suitable.

The amount of electrolyte salt (II) varies depending on a required current density, application, kind of an electrolyte salt and the like, and it is preferable that the amount is not less than 0.1 part by mass, further not less than 1 part by mass, especially not less than 5 parts by mass, and not more than 200 parts by mass, further not more than 100 parts by mass, especially not more than 50 parts by mass based on 100 parts by mass of the chain carbonate (I) having a $CF_3$-terminated fluorine-containing ether group.

The electrolytic solution of the present invention is prepared by dissolving the electrolyte salt (II) in the fluorine-containing chain carbonate (I) having a $CF_3$-terminated fluorine-containing ether group or in a solvent comprising the carbonate (I) and the solvent (III) for dissolving the electrolyte salt.

In addition, the electrolytic solution of the present invention may be in the form of gel (plasticized) prepared in combination with a polymer material which dissolves or swells in the solvent used for the electrolytic solution of the present invention.

Examples of the polymer material are known polyethylene oxide, polypropylene oxide and modified compounds thereof (JP8-222270A, JP2002-100405A); fluorine-containing resins such as polyacrylate polymer, polyacrynonitrile, polyvinylidene fluoride and vinylidene fluoride-hexafluoropropylene copolymer (JP4-506726A, JP8-507407A, JP10-294131A); complexes of those fluorine-containing resins with hydrocarbon resins (JP11-35765A, JP11-86630A) and the like.

In addition, an ion-conducting compound disclosed in Japanese Patent Application No. 2004-301934 can be used.

This ion-conducting compound is a non-crystalline fluorine-containing polyether compound having a fluorine-containing group in its side chain and is represented by the formula (1):

wherein D is represented by the formula (2):

where D1 is an ether unit having a fluorine-containing ether group in its side chain and represented by the formula (2a):

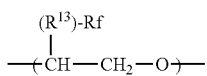

where Rf is a fluorine-containing ether group which may have a crosslinkable functional group; $R^{13}$ is a group or bond bonding Rf to a trunk chain;

FAE is an ether unit having a fluorine-containing alkyl group in its side chain and represented by the formula (2b):

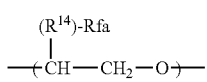

where Rfa is hydrogen atom or a fluorine-containing alkyl group which may have a crosslinkable functional group; $R^{14}$ is a group or bond bonding Rfa to the trunk chain;

AE is an ether unit represented by the formula (2c):

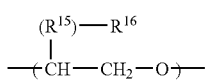

where $R^{16}$ is hydrogen atom, an alkyl group which may have a crosslinkable functional group, an aliphatic cyclic hydrocarbon group which may have a crosslinkable functional group or an aromatic hydrocarbon group which may have a crosslinkable functional group;

$R^{15}$ is a group or bond bonding $R^{16}$ to the trunk chain;

Y is a unit having at least one of the formulae (2d-1) to (2d-3):

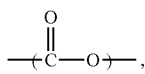

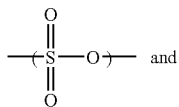

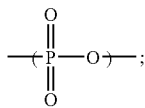

n is 0 or an integer of 1 to 200; m is 0 or an integer of 1 to 200; p is 0 or an integer of 1 to 10,000; q is an integer of 1 to 100; n+m is not 0, and the order of bonding of D1, FAE, AE and Y is not specified;

A and B are the same or different and each is hydrogen atom, an alkyl group which may have fluorine atom and/or a crosslinkable functional group, a phenyl group which may have fluorine atom and/or a crosslinkable functional group, a —COOH group, —$OR^{17}$ where $R^{17}$ is hydrogen atom or an alkyl group which may have fluorine atom and/or a crosslinkable functional group, an ester group or a carbonate group (when the end of D is oxygen atom, A and B are not a —COOH group, —$OR^{17}$, an ester group and a carbonate group).

To the electrolytic solution of the present invention may be blended other additives as case demands. Examples of other additives are, for instance, metallic oxides, glass and the like.

It is preferable that the electrolytic solution of the present invention does not freeze and the electrolyte salt is not precipitated at low temperatures (for example, at 0° C. and −20° C.). Specifically the viscosity at 0° C. is preferably not more than 100 mPa·s, more preferably not more than 30 mPa·s, particularly preferably not more than 15 mPa·s. Further specifically the viscosity at −20° C. is preferably not more than 100 mPa·s, more preferably not more than 40 mPa·s, particularly preferably not more than 15 mPa·s.

The electrolytic solution of the present invention can enhance flame retardance, low temperature characteristics, withstand voltage, solubility of the electrolyte salt and compatibility with hydrocarbon solvents at the same time, and therefore is suitable especially as electrolytic solutions for lithium secondary batteries, capacitors, radical batteries and solar cells (especially dye-sensitized solar cells). In addition, the electrolytic solution of the present invention can be used as electrolytic solutions for various sensors, electrochromic device, electrochemical switching element, aluminum electrolytic capacitor, tantalum electrolytic capacitor and the like and also as an ion conductor for antistatic coating material.

EXAMPLES

The present invention is then explained by means of Examples and Comparative Examples, but is not limited to them.

The methods of measurement employed in the present invention are as follows.

NMR: AC-300 available from BRUKER is used.
$^{19}$F-NMR:
Measuring condition: 282 MHz (trichlorofluoromethane=0 ppm)
$^1$H-NMR:
Measuring condition: 300 MHz (tetramethylsilane=0 ppm)
IR:
Measurement is carried out at room temperature with a Fourier-transform infrared spectrophotometer 1760× available from Perkin Elmer Co., Ltd.

Fluorine content (% by mass):
The fluorine content is obtained by burning 10 mg of a sample by an oxygen flask combustion method, absorbing cracked gas in 20 ml of de-ionized water and then measuring a fluorine ion concentration in the fluorine ion-containing solution through a fluoride-ion selective electrode method (using a fluorine ion meter model 901 available from Orion).

Preparation Example 1

Synthesis of Carbonate Having $CF_3$-Terminated Fluorine-Containing Ether Groups at Both Ends Thereof A reactor was assembled by providing a refluxing tube on the top of a 500 ml three-necked glass flask equipped with a stirrer (THREE ONE motor) so as to enable gas to be flowed into a washing trap or an alkali trap, and also to enable the gas discharged from the trap to be removed outside the draft, and a reaction was carried out.

Into this reactor were poured 100 g (208 mmol) of fluorine-containing alcohol having ether group:

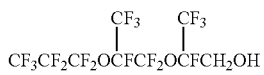

and 15.48 g (196 mmol) of pyridine, followed by stirring at −70° C. Then thereto was added dropwise a solution prepared by dissolving 49.9 g (631 mmol) of triphosgene into 150 ml of dichloromethane with a dropping funnel while flowing nitrogen gas, and heat generation was observed. The addition was conducted over 30 minutes while paying attention to the heat generation. After completion of the addition, the reaction solution was brought to room temperature, and the stirring was continued in such a state for one hour, followed by quenching with saturated ammonium chloride. The reaction solution was separated into three layers, and the solution of the lowest layer was collected. The collected solution was washed with 1N aqueous solution of HCl. Then the solution was distilled under reduced pressure (0.3 mmHg) to obtain a carbonate having fluorine-containing ether group as a distillate at 80° C. (yield: 31%).

As a result of an analysis of this product by $^{19}$F-NMR and $^{1}$H-NMR, it was confirmed that the product was a carbonate having $CF_3$-terminated fluorine-containing ether groups at both ends thereof and represented by:

$^{19}$F-NMR: (neat): −78.90 to −82.02 ppm (9F), −128.4 to −128.69 ppm (4F), −133.76 to −133.83 ppm (2F), −143.31 to −143.55 ppm (2F)

$^{1}$H-NMR: (neat): 7.78 to 7.95 ppm (4H)

In addition, a stretching vibration of a carbonyl group was confirmed at 1,789.9 $cm^{-1}$ by measuring with IR.

The fluorine content of this carbonate having fluorine-containing ether groups was 65.2% by mass.

Preparation Example 2

Synthesis of Carbonate Having $CF_3$-Terminated Fluorine-Containing Ether Groups at Both Ends Thereof Into the reactor used in Preparation Example 1 were poured 150 g (475 mmol) of fluorine-containing alcohol having ether group:

and 112 g (1.43 mol) of pyridine, followed by stirring at −70° C. Then thereto was added dropwise a solution prepared by dissolving 35 g (119 mmol) of triphosgene into 150 ml of dichloromethane with a dropping funnel while flowing nitrogen gas, and heat generation was observed. The addition was conducted over 30 minutes while paying attention to the heat generation. After completion of the addition, the reaction solution was brought to room temperature, and the stirring was continued in such a state for one hour, followed by quenching with saturated ammonium chloride. The reaction solution was separated into three layers, and the solution of the lowest layer was collected. The collected solution was washed with 1N aqueous solution of HCl. Then the solution was distilled under reduced pressure (0.3 mmHg) to obtain a carbonate having fluorine-containing ether group as a distillate at 80° C. (yield: 18%).

As a result of an analysis of this product by $^{19}$F-NMR and $^{1}$H-NMR, it was confirmed that the product was a carbonate having $CF_3$-terminated fluorine-containing ether groups at both ends thereof and represented by:

$^{19}$F-NMR: (neat): −83.56 to −83.79 ppm (10F), −85.05 to −85.15 ppm (6F), −131.72 ppm (4F), −136.93 to −136.96 ppm (2F)

$^{1}$H-NMR: (neat): 4.69 to 4.88 ppm (4H)

In addition, a stretching vibration of a carbonyl group was confirmed at 1,789.9 $cm^{-1}$ by measuring with IR.

The fluorine content of this carbonate having fluorine-containing ether groups was 63.5% by mass.

Preparation Example 3

Into the reactor used in Preparation Example 1 were poured 50 g (379 mmol) of fluorine-containing alcohol: $HCF_2CF_2CH_2OH$ and 45 g (570 mmol) of pyridine, followed by stirring at −70° C. Then thereto was added dropwise a solution prepared by dissolving 52 g (177 mmol) of triphosgene into 150 ml of dichloromethane with a dropping funnel while flowing nitrogen gas, and heat generation was observed. The addition was conducted over 30 minutes while paying attention to the heat generation. After completion of the addition, the reaction solution was brought to room temperature, and the stirring was continued in such a state for one hour. Then triphosgene was removed from the reaction system under reduced pressure. Thereto was added dropwise 120 g (380 mmol) of fluorine-containing alcohol having ether group:

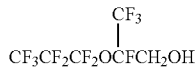

on ice bath, and stirring was continued for four hours. After completion of the reaction, the solution was separated with 1N aqueous solution of HCl, and after an oil layer was dried with magnesium sulfate, the solution was distilled under reduced pressure (0.3 mmHg) to obtain a carbonate having a fluorine-containing ether group as a distillate at 70° C. (yield: 52%).

As a result of an analysis of this product by $^{19}$F-NMR and $^{1}$H-NMR, it was confirmed that the product was a carbonate having a $CF_3$-terminated fluorine-containing ether group at one end and a fluorine-containing alkyl group at another end and represented by:

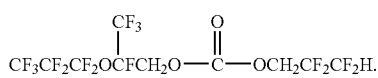

$^{19}$F-NMR: (neat): −83.56 to −83.79 ppm (5F), −85.05 to −85.15 ppm (3F), −126.0 ppm (2F), −131.72 ppm (2F), −136.93 to −136.96 ppm (1F), −139.0 to −139.4 ppm (2F)

$^1$H-NMR: (neat): 4.69 to 4.88 ppm (2H), 5.84 to 6.25 ppm (1H)

In addition, a stretching vibration of a carbonyl group was confirmed at 1,789.9 cm$^{-1}$ by measuring with IR.

The fluorine content of this carbonate having a fluorine-containing ether group was 60.1% by mass.

Comparative Preparation Example 1

Synthesis of Carbonate Having a CF$_3$-Terminated Fluorine-Containing Ether Group and a Non-Fluorine-Containing Alkyl Group Into the reactor used in Preparation Example 1 were poured 62.62 g (198 mmol) of fluorine-containing alcohol having ether group:

24.1 g (238 mmol) of triethylamine and 200 ml of THF, followed by stirring on ice bath. Then thereto was added dropwise 29.4 g (238 mmol) of propyl chloroformate with a dropping funnel. The reaction solution got turbid in white as salt was formed, and heat generation of 7° C. was confirmed. After completion of the addition, the reaction solution was stirred for three hours, followed by quenching with 1N aqueous solution of HCl. The aimed product of a lower layer was collected and washed with pure water two times.

After drying with MgSO$_4$, the solution was distilled (0.3 mmHg) to obtain a carbonate having a fluorine-containing ether group as a distillate at 39° C. (yield: 67%).

As a result of an analysis of this product by $^{19}$F-NMR and $^1$H-NMR, it was confirmed that the product was a carbonate having, only at one end thereof, a fluorine-containing ether group terminated with CF$_3$ and represented by:

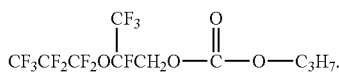

$^{19}$F-NMR: (neat): −136.0 to −135.8 ppm (1F), −131.0 ppm (2F), −84.3 ppm (3F), −82.8 to −82.7 ppm (5F)

$^1$H-NMR: (neat): 1.26 to 1.32 ppm (3H), 1.96 to 2.10 ppm (2H), 4.45 to 4.50 ppm (2H), 4.99 to 5.17 ppm (2H)

In addition, a stretching vibration of a carbonyl group was confirmed at 1,767.9 cm$^{-1}$ by measuring with IR.

Comparative Preparation Example 2

Preparation of EC/DEC

Ethylene carbonate and diethylene carbonate were mixed in a weight ratio of 1:1 to obtain a homogeneous solution mixture.

Examples 1 to 3 and Comparative Examples 1 and 2

A flash point, viscosity and compatibility with a hydrocarbon solvent were determined with respect to the carbonates having, at both ends thereof, CF$_3$-terminated fluorine-containing ether groups and obtained in Preparation Examples 1 and 2, the carbonate having a CF$_3$-terminated fluorine-containing ether group at one end and a fluorine-containing alkyl group at another end and obtained in Preparation Example 3, the carbonate having a CF$_3$-terminated fluorine-containing ether group at one end and a non-fluorine-containing alkyl group at another end and obtained in Comparative Preparation Example 1, and the mixture of non-fluorine-containing carbonates obtained in Comparative Preparation Example 2. Further LiN(SO$_2$C$_2$F$_5$)$_2$ was mixed as an electrolyte salt to the above-mentioned solutions respectively in a concentration of 1 mole per liter to prepare electrolytic solutions. With respect to these electrolytic solutions, a withstand voltage and solubility of the electrolyte salt were determined. The results are shown in Table 1.

Flash Point:

A flash point of the solution is measured according to JIS K2265 (tag closed type)

Withstand Voltage:

The electrolytic solution is put in a 3-electrode type voltage measuring cell (working electrode, counter electrode: platinum, reference electrode: Li, HS cell available from Hosen Kabushiki Kaisha). Sweeping of electric potential is carried out at 50 mV/sec with a potentiostat, and a range where a decomposition current of not less than 0.1 mA is not flowed is assumed to be a withstand voltage (V).

Viscosity:

A viscosity of the solution is measured under the number of revolutions of 60 rpm at a temperature of 25° C., 0° C. and −20° C. with a Brookfield viscometer (VISCONE CV series available from Misec Corporation) by using a cone having a measuring range from 1 to 500 mPa·s.

Solubility of Electrolyte Salt:

To the solution is added LiN(SO$_2$C$_2$F$_5$)$_2$ and tetraethyl ammonium tetrafluoroborate [(C$_2$H$_5$)$_4$NBF$_4$], respectively at room temperature so that a concentration thereof is 1 mole per liter, followed by stirring sufficiently, and solubility is observed with naked eyes.

○: Dissolved homogeneously.

Δ: Slightly suspended.

x: Insoluble matter precipitated.

Compatibility with Hydrocarbon Solvent:

A hydrocarbon solvent is added to the solution at room temperature until its concentration becomes 50% by volume, followed by sufficiently stirring, and solubility is observed with naked eyes. The hydrocarbon solvents used are propylene carbonate (PC) and diethylene carbonate (DEC).

○: Dissolved homogeneously.

x: Separated into two phases.

TABLE 1

| | Ex. 1 | Ex. 2 | Ex. 3 | Com. Ex. 1 | Com. Ex. 2 |
|---|---|---|---|---|---|
| Carbonate | Prep. Ex. 1 | Prep. Ex. 2 | Prep. Ex. 3 | Com. Prep. Ex. 1 | Com. Prep. Ex. 2 |
| Flash point (° C.) | >80 | >80 | >80 | 43 | 24 |
| Withstand voltage (V) | 7.7 | 7.5 | 7.9 | 6.1 | 5.6 |
| Viscosity (25° C.: mPa · sec) | 1.2 | 0.8 | 1.1 | 1.8 | 0.6 |
| Viscosity (0° C.: mPa · sec) | 4.7 | 3.1 | 5.2 | 5.2 | Solidified |
| Viscosity (−20° C.: mPa · sec) | 8.2 | 4.1 | 8.1 | 9.1 | Solidified |
| Solubility of electrolyte salt | | | | | |
| LiN(SO$_2$C$_2$F$_5$)2 | ○ | ○ | ○ | ○ | ○ |
| (C$_2$H$_5$)$_4$NBF$_4$ | x | ○ | ○ | ○ | ○ |
| Compatibility with hydrocarbon solvent | | | | | |
| PC | ○ | ○ | ○ | ○ | ○ |
| DEC | ○ | ○ | ○ | ○ | ○ |

Example 4 and Comparative Example 3

Into a 3 ml sampling bottle was poured 1 g of the solvent mixture of ethylene carbonate (EC) and diethylene carbonate (DEC) prepared in Comparative Preparation Example 2, and thereto was added 0.5 g of a fluorine-containing ether ($CF_3CF_2CH_2OCF_2CF_2H$), followed by sufficiently stirring. The solution was separated into two layers.

To this solution separated into two layers was added 1.2 g of the fluorine-containing chain carbonate synthesized respectively in Preparation Example 3 and Comparative Preparation Example 1, followed by sufficiently stirring and then allowing to stand. Thereafter a state of the solution mixture was observed with naked eyes. The result of evaluation is indicated by ○ when the solution is homogeneous, Δ when the solution is in a suspended state, and x when precipitation (separation) occurs. As a result, in Example 4 compatibility was ○, but in Comparative Example 3, compatibility was x.

Example 5

A coin type lithium secondary battery was produced by the following method.
(Preparation of Positive Electrode)

Carbon black (6% by mass) and polyvinylidene fluoride (brand name KF-1000 available from Kureha Kagaku Kabushiki Kaisha) (9% by mass) were added and mixed to $LiCoO_2$ (85% by mass) and the mixture was formed into a slurry by dispersing with N-methyl-2-pyrrolidone. The obtained mixture in the form of slurry was used as an active material for a positive electrode and coated uniformly on a 20 μm thick aluminum foil which was a current collector for a positive electrode. After drying, the coated aluminum foil was punched into a disc form having a diameter of 12.5 mm to make a positive electrode.
(Preparation of Negative Electrode)

A styrene-butadiene rubber (SBR) dispersed in distilled water was added to 94% by weight of artificial graphite powder (brand name KS-44 available from TIMCAL) to be a solid content of 6% by weight, and then was mixed with a disperser to be formed into a slurry. The mixture was uniformly coated on a 18 μm thick copper foil which was a current collector for a negative electrode. After drying, the coated copper foil was punched into a disc form having a diameter of 12.5 mm to make a negative electrode.
(Preparation of Coin Type Lithium Secondary Battery)

The above-mentioned positive electrode was put in a stainless steel can which doubled as a current collector for a positive electrode, and then the above-mentioned negative electrode was put thereon with a polyethylene separator impregnated with the electrolytic solutions raised below being placed between them. This can and a sealing sheet which doubled as a current collector for a negative electrode were sealed by caulking with an insulating gasket being placed between them to make a coin type lithium secondary battery.

After applying dc voltage (3.5 V) to this secondary battery for 48 hours, charging and discharging were carried out at a current density of 0.3 mA/cm². Charging and discharging 100 times is assumed to be one cycle, and a rate of decrease in capacity to an initial capacity was determined.
(1) Electrolytic solution comprising $LiPF_6$ (1M); EC/DEC and the carbonate having fluorine-containing ether group of Preparation Example 1 (1/1/0.2% by weight ratio).

A rate of decrease in capacity after 100 cycles was 8%.
(2) Electrolytic solution comprising $LiPF_6$ (1M); EC/DEC and the carbonate having fluorine-containing ether group of Preparation Example 1 (1/1/0.1% by weight ratio).

A rate of decrease in capacity after 100 cycles was 6%.
(3) Electrolytic solution comprising $LiPF_6$ (1M); EC/DEC and the carbonate having fluorine-containing ether group of Preparation Example 2 (1/1/0.2% by weight ratio).

A rate of decrease in capacity after 100 cycles was 13%.
(4) Electrolytic solution comprising $LiPF_6$ (1M); EC/DEC and the carbonate having fluorine-containing ether group of Preparation Example 2 (1/1/0.1% by weight ratio).

A rate of decrease in capacity after 100 cycles was 8%.

Example 6

Ethanol was added to a mixture of a phenol resin active carbon activated with steam and having a specific surface area of 2,000 m²/g, polytetrafluoroethylene (PTFE) and carbon black in a mass ratio of 8:1:1, followed by kneading. The resulting kneaded product was molded into a sheet and rolled into a 0.6 mm thick sheet. The obtained sheet was punched into a disc having a diameter of 12 mm to prepare an electrode.

This disk-like electrode was adhered to the inside of a positive electrode side and a negative electrode side of a stainless steel case by using a graphite adhesive, in which the stainless steel case served as a current collector and a housing member of a coin cell. Then this stainless steel case was subjected to heat treatment at 200° C. under reduced pressure to remove water, and the disk-like electrode was impregnated with an electrolytic solution prepared by dissolving tetramethyl ammonium.$BF_4$ as an electrolyte salt in the compound synthesized in Preparation Example 1 to make 1M concentration. Then a separator (thickness: 160 μm, percentage of void: 70%) made of a non-woven fabric of polypropylene fiber was put between the both electrodes and the stainless steel case was sealed by caulking with a gasket which was an insulator. Thus a 2.0 mm thick coin type electrolytic double layer capacitor having a diameter of 18.4 mm was produced.

After applying dc voltage (3.5 V) to this capacitor for 48 hours, charging and discharging were carried out 2,000 times at a current density of 0.3 mA/cm². A capacity before and after the charging and discharging was measured, and a rate of decrease in capacity to the initial capacity was determined.

The initial capacity was 132 F/g, and the capacity after charging and discharging 2,000 times was 119 F/g. Thus a rate of decrease in capacity was 9.8%.

INDUSTRIAL APPLICABILITY

According to the present invention, there can be provided the electrolytic solutions being capable of enhancing flame retardance, low temperature characteristics, withstand voltage, solubility of an electrolyte salt and compatibility with hydrocarbon solvents in good balance.

The invention claimed is:
1. An electrolytic solution comprising a chain carbonate (I) and an electrolyte salt (II), wherein the chain carbonate (I) is represented by the formula (I):

wherein $Rf^1$ is a fluorine-containing ether group having $CF_3$ end group and represented by the formula (Ia-1):

$$CF_3(R^1)_{\overline{n1}}(OR^2)_{\overline{n2}} \qquad (Ia-1)$$

wherein $R^1$ is an alkylene group optionally containing fluorine atom; $R^2$ is a fluorine-containing alkylene group; n1 is 0 or 1; n2 is an integer of 1 to 3;

$Rf^2$ is a fluorine-containing alkyl group having a $CF_3$ end group or a fluorine-containing ether group having $CF_3$ or $CH_3$ end group.

2. The electrolytic solution of claim 1, wherein in said chain carbonate (I), $Rf^2$ is the fluorine-containing ether group represented by said formula (Ia-1).

3. The electrolytic solution of claim 1, wherein in said chain carbonate (I), a fluorine content of $Rf^1$ and/or $Rf^2$ is 10 to 76% by mass.

4. The electrolytic solution of claim 1, having a viscosity at 0° C. of not more than 30 mPa·s.

5. The electrolytic solution of claim 1, having a viscosity at −20° C. of not more than 40 mPa·s.

6. The electrolytic solution of claim 2, wherein in said chain carbonate (I), a fluorine content of $Rf^1$ and/or $Rf^2$ is 10 to 76% by mass.

7. The electrolytic solution of claim 2, having a viscosity at 0° C. of not more than 30 mPa·s.

8. The electrolytic solution of claim 2, having a viscosity at −20° C. of not more than 40 mPa·s.

* * * * *